United States Patent Office 3,031,417
Patented Apr. 24, 1962

3,031,417
PREPARATION OF FIBROUS ALUMINA MONO-
HYDRATE AND AQUASOLS THEREOF
Eric Wilkinson Bruce, Wilmington, Del., assignor to E. I.
du Pont de Nemours and Company, Wilmington, Del.,
a corporation of Delaware
No Drawing. Filed Apr. 21, 1958, Ser. No. 730,024
6 Claims. (Cl. 252—313)

This invention relates to the discovery that fibrous alumina monohydrate aquasols can be prepared from an aluminum hydroxide using a weak acid.

Heretofore, no way has been known to use weak acids to make long fibers of alumina monohydrate from basic aluminum carbonate starting materials. Weak acids are naturally preferred in preparing fibrous alumina monohydrate aquasols because weak acids are generally less corrosive, more volatile and more easily distilled, recovered and recycled than are strong acids. But when basic aluminum carbonates prepared according to the prior art are heated with weak acids, fibrous alumina monohydrate aquasols are not produced.

But, by the processes of the present invention, fibrous alumina monohydrate aquasols are prepared from an aluminum hydroxide using a weak acid.

More particularly, this invention is directed to processes whereby a weak acid is used to prepare fibrous alumina monohydrate aquasols by heating the weak acid under controlled conditions with a special hydrated alumina.

This special hydrated alumina is prepared from alum ($Al_2(SO_4)_3 \cdot 18H_2O$) and a water-soluble carbonate by mixing together under controlled conditions respective aqueous solutions of alum and soluble carbonate and then carefully conditioning the resulting water-insoluble, carbonated, hydrated alumina gel so formed.

This gel is then heated with acetic or formic acid under autogenous pressure in the presence of water to from about 140 to 180° C. for a time from about 10 minutes to 7 hours, although heating time can vary within wide limits. During this period a fibrous alumina monohydrate aquasol forms.

Details of the invention will now be given.

THE CARBONATED HYDRATED ALUMINA GELS
AND THEIR PREPARATION

The water-insoluble, carbonated, hydrated alumina gels used in the processes of this invention are granular and readily filterable. They have a sulfate ion ($SO_4^=$) of about 0.010 mol per gram atom of aluminum and a total cation content of less than about 0.040 mol per gram atom of aluminum.

More preferred gels have a mol ratio of sulfate ions to aluminum of less than about 0.005:1 and a mol ratio of cations to aluminum less than about 0.03:1. Most preferred gels have a mol ratio of cations to aluminum of from about 0.001:1 to 0.020:1.

In addition, the gels have a theta ($\theta$) value of less than 300 minutes and preferably less than 150 minutes as measured in 0.50 N acetic acid at 30° C.

The exact chemical composition of the carbonated, hydrated alumina gel is unknown, but the gel does consist of a hydrated alumina containing aluminum atoms and hydroxy ions together with carbonate ions either chemically or physically adsorbed. The gel is definitely not the salt $Al_2(CO_3)_3$.

To prepare the gel, respective aqueous solutions of alum and water-soluble carbonate are prepared. Any water-soluble carbonate can be used, but sodium carbonate, potassium carbonate and ammonium carbonate are greatly preferred. The concentrations of alum and carbonate solutions that can be used as starting materials are not critical and any concentration up to saturated solutions will function satisfactorily. However, for convenience the more highly concentrated solutions are preferred.

It has been found that alum solutions containing one part alum and two parts distilled or demineralized water and carbonate solutions containing one part carbonate, as for example, sodium carbonate, and four parts distilled or demineralized water are particularly satisfactory.

The demineralized water used can be prepared in the usual way by the two-step process in which soluble salts are first converted into acids by passing the water through a hydrogen exchanger and then passing the water through an acid adsorbent (synthetic resin) to remove the acids.

The two solutions, while being maintained at room temperature (15° to 50° C.) are simultaneously added to an agitated heel of water. The amount of water in the heel is not critical. A convenient reaction vessel is a standard, open, cylindrical tank preferably fitted with baffles suitably placed to increase mixing efficiency. The tank contents can suitably be stirred by means of flat paddles attached to an agitator suitably mounted in or over the tank. The tank can initially contain sufficient water to cover the bottom-most paddle blade.

The two respective solutions of alum and carbonate are directed as streams into the agitated vessel contents and a gel thereupon precipitates. Although the concentration of reactants in the respective starting solutions is not critical, the instantaneous and cumulative ratio of carbonated ion to aluminum ion in the combined solutions must be carefully controlled during gel formation. The ratio of mols of carbonate ions ($CO_3^=$) to each gram of aluminum atom must be kept between 1.50 and 1.90, and preferably must be kept about 1.70±0.05, during the precipitation.

This means that, at all times during gel formation, the amount of carbonate ion present is always equal to or greater than the stoichiometric quantity needed to form aluminum carbonate $Al_2(CO_3)_3$. The ratio of $CO_3^=$/Al is maintained by carefully metering solutions of known concentrations of alum and carbonate into the agitated heel of water.

The resulting slurry, containing water, the gel and dissolved and occluded salts, is transferred from the precipitation tank and dewatered by centrifugation or filtration. A convenient dewatering device is a vacuum filter nutsche. The basic aluminum carbonate is then washed to the desired purity level. The extent of washing required to purify the gel to a proper purity range will, of course, be influenced by the ratio of reactants, concentration, temperature of the water and the filtration rates.

In general, the cations present in the freshly prepared carbonated, hydrated aluminum gel will be those obtained from the initial reactants. These cations will mainly be those derived from the soluble carbonate used to react with the alum and will be, therefore, in the preferred situation, sodium, potassium or ammonium cations.

In general, it is preferred to use Reagent Grade starting materials in order to minimize the presence of trace or extraneous impurities in the carbonated, hydrated alumina gel. "Reagent Grade" indicates starting materials which meet American Chemical Society specifications as is well-known to anyone familiar with chemistry.

Hot water is usually more effective in removing these cation impurities than cold water while cold water is usually more effective in removing sulfate ions than is hot water. It is desired to obtain an optimum rate of removing water using water at an intermediate temperature so that both cations and sulfate ions can be removed simultaneously. In particular, it is desirable to use warm water with a temperature above about 50° C. Temperatures as high as 85° C. may be used satisfactorily if the alumina is hot for only a brief time interval. It is much preferred, however, that the temperature of the wash water not exceed 70° C. as higher temperatures cause a rapid decrease in the reactivity of the carbonated, hydrated alumina gel.

As has been indicated previously, the carbonated, hydrated alumina gel must be washed to a well-defined purity level in order to be suitable for preparing fibrous alumina monohydrate. Carbonated, hydrated alumina gels with a high concentration of adsorbed sulfate ions do not give the fibrous form of alumina monohydrate while high cation concentrations give short, aggregated fibers. As has been indicated the washing is continued until the sulfate ions concentration is less than about 0.010 mol per gram atom of alumina and the total cation content is less than about 0.040 mol per gram atom of alumina. Preferred gels have the above-indicated low ratios of sulfate ions to aluminum and of cations to aluminum.

The sulfate ion concentration is determined by reduction to hydrogen sulfide ($H_2S$) absorption of the $H_2S$ in the NaOH and iodometric titration of the $Na_2S$. Equipment and reducing mixtures are discussed in Anal. Chem., 23, 1859 (1951). Aluminum is determined by dissolving the sample in caustic and using the volumetric procedure in Anal. Chimica Acta, 12, 308 (1955). The cation, which can be $Na^+ K^+$ or $NH_4^+$ is determined on HCl solutions of samples using the standard flame photometric techniques. The conventional methods for determining cations can be used. For example, the methods described in Scott's Standard Methods of Chemical Analysis, D. Van Nostrand Company, can be used.

In addition to discovering that gels having a purity level as above-described lead to fiber formations and that such gels can be produced by the methods described and illustrated, it has also been discovered that gels of a given activity are necessary for the formation of fibrous alumina monohydrate fibrils. It is an outstanding advantage of the above-described method of preparation of carbonated, hydrated alumina gels that this same method can also be used to produce gels having the proper activity.

The activity in the gel is a complex relationship among surface area, particle size, degree of hydration and molecular structure. Although it is difficult to chemically and physically describe the activity of a gel, such activity can be conveniently measured in terms of a value called theta ($\theta$) which is the time in minutes required to depolymerize half of a measured sample of gel in the presence of excess 0.50 N acetic acid at 30° C. Gels having an activity such that $\theta$ is less than 300 minutes and preferably less than 150 minutes are required in order to produce fibrous alumina monohydrate according to the processes of this invention. Still more preferred are gels of $\theta$ values of less than 50 minutes.

The activity, $\theta$, is determined as follows: Since the rate of dissolution of the carbonated, hydrated alumina gel is highly temperature sensitive, a constant temperature of 30°±0.1° C. is necessary. Two hundred ml. of 0.50 N acetic acid previously brought to the temperature of 30° C. is added to 0.5 gram of $Al_2O_3$ equivalent (5.0 grams ±0.05 gram of about 10% carbonated hydrated alumina gel) in a beaker partially submerged in a constant temperature bath. A means of stirring is provided and a conductivity cell is immersed in the mixture. The conductivity is noted at intervals timed by a stopwatch and either (a) the exact time the specific conductance reaches $2165 \times 10^{-6}$ mhos ($R_S$)=462 ohms) is noted or (b) bracketing times and conductances are noted and the time at which about $2165 \times 10^{-6}$ mhos (derived from calibration curve—as described below) is determined from a plot of the data.

If the gel Na/Al ratios are substantially above about 0.015, the conductance must be recalibrated by determining the conductances at several $Al_2O_3$ levels after standing twenty-four hours in the acetic acid solution. A plot of these values establishes a calibration correction for the point at which half (0.25 gram) of the $Al_2O_3$ is dissolved. As a rule, a variation from true value of ±5 percent can be tolerated so no correction is usually necessary.

After washing, the filter cake is usually transferred to a storage vessel and held for a period of from about one day to one week. Such aging does not appear to do any harm to the gels. In general, it is preferred to use carbonated, hydrated alumina gels aged within this time interval as the use of fresh filter cake apparently results in relatively wide batch to batch variation in product properties.

In general, while carbonate concentrations in the gel up to even 40 or 50 percent by weight of the $Al_2O_3$ content produce no noticeable effect upon product aquasol properties, the effects produced by $Na^+$ and $SO_4^=$ ions in the gel are profound. Furthermore, as will be seen below in the normal course of the processes of this invention, $CO_3^=$ is destroyed and removed in the optional first stage of the heating process. In this "boil-out" step the carbonate is destroyed and removed as carbon dioxide. But even if this boil-out step is omitted, carbonate ion concentration up to as much as 40 or 50 percent of the $Al_2O_3$ content produces no noticeable effect on aquasol product properties.

The ratio of carbonate ions to aluminum in terms of mol ratios has been shown to affect the ion level in the wash gel in that the higher the ratio of carbonate ions to aluminum, the lower the sulfate level. Also the reactant ratio of carbonate to aluminum affects the volume of water necessary to wash the gel to a given sodium level. In general, the higher the reactant ratio the more water required.

Although the above procedure represents the preferred method for obtaining carbonated, hydrated alumina gels having the indicated activity and purity, any carbonated, hydrated alumina gel within the critical ranges of purity and activity specified will function satisfactorily in the processes of the present invention.

HEATING OF CARBONATED, HYDRATED ALUMINA GEL WITH WEAK ACID

The purified gel preferably in the form of a dewatered and aged cake is next transferred to an autoclave and diluted with acetic or formic acid so that the final gel concentration is between 5 and 10 percent by weight expressed as $Al_2O_3$ and the ratio of aluminum atoms to acid anion is from about 0.5:1 to 4.0:1.

At this point this mixture can optionally be refluxed for a period of time in order to remove any excess of carbon dioxide which may be evolved.

The preferred procedure is to first vigorously slurry the gel with distilled or demineralized water so as to form an aqueous dispersion in the reaction vessel. This dispersion should contain a concentration of gel in the aqueous dispersion from about 5 to 10 percent by weight expressed as $Al_2O_3$. Preferably the dispersion is homogenized to break up any lumps which may be present. Slurrying and homogenizing are best carried out in stainless steel equipment. The slurry is either prepared in another vessel and then placed in the reaction vessel or is prepared directly in the reaction vessel.

After formation of the slurry, enough acetic or formic acid is added to the slurry to make the concentration of acid anions such that the ratio of aluminum atoms to acid anions is from about 0.5:1 to 4.0:1 as stated. The concentration of the acid added to the slurry is not critical, but it is preferred to agitate the slurry during acid addition, in order to obtain quick and convenient mixing. The reaction vessel is preferably provided with heating means in the form of a heating jacket or walls capable of heating and maintaining the temperature of the charge in the range of from about 140 to 180° C. Also, the vessel must be capable of being closed and strong enough to withstand autogenous pressures. The vessel could also be provided with a stirrer so that caking of the charge on vessel walls during heating is avoided.

The result of adding acid to the aqueous dispersion is to cause the carbonated, hydrated alumina gel to go into solution so that a water-clear reactant mix is obtained.

After reactants are charged and mixed, the reaction vessel is heated. The heating process can proceed in two stages, the first of which is an optional stage. In the optional first stage, the carbonated, hydrated alumina gel, acid and water mixture is heated to a temperature sufficiently high enough to cause the evolution of carbon dioxide. Usually this temperature is below the reflux temperature of mix. As the carbon dioxide evolves, it can be vented. If vented, the reaction vessel should be fitted with a condenser so that the carbon dioxide can be vented from a boiling charge without loss of water or acid. By venting the carbon dioxide as formed, pressures above autogenous are avoided in this stage. When evolution ceases the second stage can be pursued.

In the required second stage, the reaction vessel is heated to a reaction temperature of from about 140 to 180° C. under autogenous pressure. The heat-up time should preferably be not longer than 30 minutes. The charge is held at reaction temperature for a period of from about 10 minutes to 7 hours depending upon the temperature of the reaction and the product property desired. After the charge has been heated for the desired time, it is cooled as rapidly as possible to from about 50° to 80° C. and discharged. The cool-down time should preferably not be longer than about 30 minutes.

During the autoclaving stage, fibrous alumina monohydrate forms as an aquasol.

PRODUCTS

The products resulting from the processes of this invention are aquasols containing crystalline fibrous alumina monohydrate fibrils. These fibrils are believed to have a chemical structure corresponding to the formula AlOOH. Their average length as determined from electron micrographs can be from 100 m$\mu$ to 1500 m$\mu$, but in the more preferred case is 100 m$\mu$ to 700 m$\mu$. The fibers possess the boehmite crystal lattice, or at least the fibers display the characteristic X-ray diffraction pattern of boehmite crystals. From all available evidence, the fibrils of the invention are identical to those particularly described in co-pending application Serial No. 730,035, filed April 21, 1958, now abandoned, but continued in application Serial No. 783,602, filed December 21, 1958, and issued December 1, 1959, as U.S. Patent 2,915,475.

The fibers produced by the processes of this invention have two dimensions which are in the colloidal range. Of course, assemblies of fibrils may flocculate and form fibers which are supercolloidal in size. The size and shape of the particles in the product aquasols can be conveniently determined by diluting an aquasol with water to contain about 0.1 percent $Al_2O_3$ equivalent weight or preferably a lower weight of $Al_2O_3$, and then examining a dried film from such dilute aquasol with the electron microscope. The average length of the product of this invention is from 100 m$\mu$ to 1500 m$\mu$. This average length can be accurately determined with the electron microscope by using the procedures described in "Introduction to Electronmicroscopy" by C. E. Hall (McGraw-Hill Book Company, 1953) and in an article by R. C. Backus and R. C. Williams in the Journal of Applied Physics, vol. 21, page 11, 1950. These procedures are more fully described in the above-noted co-pending application together with the results obtained therefrom.

The length of the fibrils can also be determined by streaming birefringence. A complete discussion of this technique is also given in the cited co-pending application. The length obtained by this method is called $L_f$, the most frequently occurring particle length.

The fibril length obtained by the two methods will agree closely only if a particular product is but a little aggregated and does not aggregate during the measurements. Ordinarily, the measurement of streaming birefringence itself causes alignment and aggregation of fibrils so that the length of fiber/$L_f$ will ordinarily be larger than that calculated from the electronmicrograph. These products can have an $L_f$ ranging from 200 to 2000 m$\mu$ although in the preferred case they will range from 200 to 800 m$\mu$.

The particle size and shape of the alumina monohydrate particles is further defined by the specific surface area of the particle. A complete discussion of this can also be found in the above-noted co-pending application. The specific surface area, $A_N$, is determined according to the method of P. H. Emmett, A New Method for Measuring the Surface Area of Finely Divided Materials and for Determining the Size of Particles in Symposium for New Methods on Particle Size Determination in the Sub-Sieve Range, p. 95, published by the American Society for Testing Materials, March 4, 1941. The products of this invention in general have preferred specic surface areas ranging from around 250 to 350 m.$^2$/gram although the specific surface area can range from about 200 to 400 m.$^2$/gram.

The time, $\theta$, required to dissolve one-half of a sample product in an excess of hydrochloric acid in a temperature of 98° C. is from 120 to 300 minutes.

X-ray diffraction of the fibrils discloses that they have the X-ray diffraction of boehmite and the ratio of peak intensities of the product to boehmite of a surface of less than 10 m.$^2$/g. at the 020 crystal lattice plane being less than 40:100.

The infrared adsorption spectrum showing adsorption bands at the following wave lengths: 3.05, 3.25, 4.80, 5.08, 8.70, 9.11 and 13.2, the ratio of the optical density of the infrared adsorption band at 3.05 microns to that at 3.25 is from 1.2:1 to 1.8:1.

The products of the processes of this invention are in the form of aquasols, as has been noted. The water in the aquasol can optionally be evaporated either to produce sols having a high concentration of fibrous alumina monohydrate (fibrous boehmite) or to produce dry powders of such fibrils. When drying the sols to a powder any one of a number of different conventional types of equipment can be used. For example, rotary drum drying and tray drying can be used.

Very high rates of acid recovery are possible. It has been found, however, that the fibrous boehmite fibrils usually retained perhaps up to about 10 percent by weight of the total amount of weak acid added at the start of the heating phase. These were bonded to or adsorbed upon the surface of the monohydrate fibrils. It is believed that the surfaces of the fibers may be esterified at least to some extent with acid anions.

The concentration of fibrous alumina monohydrate in the aqueous colloidal dispersions resulting from this process can be as high as 20% in the case of completely deionized sols but in the preferred case in which acid stabilized sols are used the upper concentration limit is about 7.00% as $Al_2O_3$. The upper concentration of 7.00% alumina is fixed by the tendency of these materials to gel unless completely deionized.

The acid used to stabilize the aquasols of boehmite can be acetic, formic, nitric or hydrochloric acid. The concentration of acid in the sols can be as high as 13%, but in the preferred case is less than 8%.

Throughout this specification the concentration of alumina in fibrous alumina monohydrate is given in percent $Al_2O_3$. This does not mean that the alumina is present as $Al_2O_3$ but is merely expressed in this manner because the determination of $Al_2O_3$ is very conveniently carried out. The procedure is to evaporate the sol or dispersion to dryness, ignite the sample and weigh the residue of $Al_2O_3$.

The following Table I presents in tabular form a summary of the critical process conditions in the invention.

for 5 minutes to drive off carbon dioxide. This reaction mix was then transferred to a stainless steel autoclave equipped with an agitator and heated to 160° C. in a period of 24 minutes. Temperature was maintained at 160° C. for one hour and then the charge was cooled to

Table I

| | Broad Limits | Preferred Limits | More Preferred Limits |
|---|---|---|---|
| (a) Precipitation mole ratio ($CO_3^-$/Al) | from about 1.50:1 to 1.90:1 | about 1.7 ± 0.05:1 | about 70° ± 4° C. |
| (b) Temperature of the washing water | less than about 90° C | about 50° C. to 85° C | |
| (c) Sulfate ion level in carbonated, hydrated alumina gel ($SO_4^-$/Al mole ratio) | less than about 0.01:1 | less than about 0.005:1 | |
| (d) Cation ion level in carbonated, hydrated alumina gel (cation/Al mole ratio) | less than about 0.04:1 | less than about 0.03:1 | between about 0.001:1 and 0.020:1. |
| (e) Activity of carbonated, hydrated alumina gel in terms of θ | less than about 300 minutes | less than about 150 minutes | |
| (f) Initial concentration of carbonated, hydrated alumina gel in slurry before autoclaving in terms of $Al_2O_3$ content | about 5 to 10% by weight | | |
| (g) Aluminum to weak acid anion ratio before and during autoclaving | from about 0.50:1 to 4.0:1 | from about 0.75:1 to 1.5:1 | |
| (h) Autoclaving temperature range | from about 140 to 180° C | about 160° ± 4° C | |
| (i) Autoclaving time | from about 10 min. to 7 hrs | from about ¾ hr. to 1½ hr | |
| (j) Fibril length of product: | | | |
| By electron micrograph | 100–1,500 mμ | 100–700 mμ | |
| By streaming birefringence ($L_f$) | 200–2,000 mμ | 300–800 mμ | |

In order that the invention may be better understood, the following specific illustrative examples are given in addition to the examples already given above:

EXAMPLE 1

An alumina gel was precipitated by simultaneously metering an alum solution containing 1 part

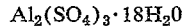

$$Al_2(SO_4)_3 \cdot 18H_2O$$

and 2 parts distilled water and a sodium carbonate solution containing 1 part $Na_2CO_3$ and 4 parts distilled water into the agitated reaction mass in an open tank. The reactant ratio, $CO_2$/Al, was maintained at 1.67±0.02 (molar basis) at all times during the precipitation. After precipitation, the gel slurry was transferred to a filter nutsche and filtered using vacuum. The filter cake was washed on the nutsche using nine successive washes of distilled water at 70° C. Each wash volume was approximately equivalent to the volume of the filter cake.

Thirty-eight parts of washed cake was transferred to a stirred kettle and mixed with 10.2 parts distilled water. mixture was placed in a flask equipped with a paddle agitator and heated to boiling (100° C.) and held at reflux This mixture was homogenized by pumping it through a centrifugal pump four times. This homogenized slurry analyzed as:

Percent $Al_2O_3$ ------------------------------- 7.94
Percent Na --------------------------------- 0.010
Percent $SO_4$ -------------------------------- 0.054
Na/Al ------------------------------------- .0028
$SO_4$/Al ------------------------------------ .0036

Two thousand two hundred parts of this slurry was aged for 24 hours at 25° C. and then mixed with 1218 parts distilled water and 82.4 parts glacial acetic acid. This 70° C. in 10 minutes and discharged from the autoclave. This material, consisting of 3.5 kg. of product was a translucent, fluid sol analyzed as follows:

Percent $Al_2O_3$ ------------------------------- 4.96
Percent $CH_3COOH$ --------------------------- 2.40
AN -----------------------------------m.²/g-- 301
$L_f$ -------------------------------------mμ-- 279

EXAMPLES 2 TO 9

Using the same procedure as in the foregoing example, the products which in all cases were 3.5 kg. were prepared by varying quantities of residual impurities and reaction conditions, such as autoclaving time, temperature, acetic acid concentration. Thus the gels were prepared by the identical procedure of Example 1 but were washed with varying amounts of water and autoclaved at other temperatures, acetic acid concentrations and reaction times.

The results are summarized in Table II, infra.

Table II

| Example No. | Wash Vol. | Homog. Gel Slurry Anal. | | | Autoclaving Conditions | | | | Sol Analysis | |
|---|---|---|---|---|---|---|---|---|---|---|
| | | $Al_2O_3$, Percent | Na, Percent | $SO_4$ Percent | $Al_2O_3$, Percent | Molar Al/OAc | Temp., ° C. | Time, Hrs. | $A_N$, m.²/g. | $L_f$, mμ |
| 1 | 9 | 7.94 | 0.010 | 0.054 | 4.96 | 2.52 | 160 | 1 | 301 | 279 |
| 2 | 9 | 7.94 | 0.010 | 0.054 | 4.96 | 2.52 | 160 | 2 | 256 | 341 |
| 3 | 9 | 7.94 | 0.010 | 0.054 | 4.78 | 2.46 | 140 | 1 | 355 | 240 |
| 4 | 9 | 7.94 | 0.010 | 0.054 | 4.88 | 2.30 | 180 | 1 | 196 | 360 |
| 5 | 9 | 7.94 | 0.010 | 0.054 | 4.88 | 0.80 | 160 | 2 | 259 | 385 |
| 6 | 9 | 7.94 | 0.010 | 0.054 | 4.93 | 4.35 | 160 | 1 | 287 | 387 |
| 7 | 13.5 | 8.43 | 0.002 | 0.015 | 5.14 | 3.46 | 172 | 0.25 | 295 | 313 |
| 8 | 9 | 7.94 | 0.010 | 0.054 | 4.96 | 2.52 | 180 | 0.17 | 246 | 304 |
| 9 | 9 | 7.94 | 0.010 | 0.054 | 4.96 | 2.52 | 140 | 7 | 271 | 331 |

EXAMPLE 10

An alumina gel was prepared as described in Example 1. The molar $CO_3$/Al ratio was maintained constant at 1.63±0.02. The gel was then filtered and washed on a filter nutsche using nine successive washes of hot water, each wash approximately equal in volume to the volume of the filter cake. The washed cake was homogenized by mixing 3151 parts cake with 1500 parts water in a laboratory Waring Blendor. This homogenized slurry analyzed as:

Percent $Al_2O_3$ ------------------------------- 6.08
Percent Na --------------------------------- 0.002
Percent $SO_4$ -------------------------------- 0.077
Na/Al ------------------------------------- .0007
$SO_4$/Al ------------------------------------ .0067

To 2790 parts of slurry, 82.5 parts glaical acetic acid and 627 parts distilled water were added and the mixture heated to boiling and refluxed for five minutes. This boiled-out slurry was then charged to a stirred autoclave, brought to 160° C. in 8 minutes, held at this temperature for one hour, and then cooled to 70° C. within 10 minutes and discharged. The product was a translucent fluid sol which had an $L_f$ of 332 m$\mu$ and $A_N$ of 296 m.$^2$/g.

EXAMPLE 11

An alumina gel was prepared as described in Example 1. The molar $CO_3/Al$ ratio was maintained constant at 1.70±00.2. The gel was then filtered and washed on a filter nutsche using a wash volume calculated to be 140 parts of 71° C. distilled water to each part $Al_2O_3$. Washing was done continuously over a three-hour period by maintaining at least an inch depth of water over the filter cake by continuous addition of fresh wash water. To 64.2 parts washed cake 35.8 parts distilled water were added and the mixture homogenized by passing it through a two-stage centrifugal pump four times. This homogenized slurry analyzed as:

| | |
|---|---|
| Percent $Al_2O_3$ | 6.1 |
| Percent Na | 0.016 |
| Percent $SO_4$ | 0.046 |
| Na/Al | .0058 |
| $SO_4$/Al | .0040 |

To 181 parts gel slurry 5.2 parts glacial acetic acid and 35 parts distilled water were added. This mixture was placed in a stirred atuoclave, pressurized to 20 p.s.i.g. with nitrogen, and heated to 120° C. in 11 minutes. The nitrogen was added as it helped reduce foaming on the scale of operations used here. The autoclave was held at 120° C. for 11 minutes while the pressure was slowly reduced to 20 p.s.i.g. by venting the autoclave. At the end of this period the autoclave was heated to 158° in a 36-minute period and held at this temperature for 45 minutes. The autoclave was then cooled to 50° C. in 60 minutes and the contents discharged. The product, a translucent fluid sol analyzed as:

| | |
|---|---|
| Percent $Al_2O_3$ | 5.05 |
| Percent HOAc | 2.37 |
| $L_f$ m$\mu$ | 287 |
| $A_N$ m.$^2$/g | 307 |

EXAMPLE 12

An alumina gel was prepared as described in Example 1. The molar $CO_3/Al$ ratio was maintained constant at 1.66±0.02. After precipitation, the gel was treated as in Example 1 to give a slurry which analyzed as follows:

| | |
|---|---|
| Percent $Al_2O_3$ | 7.94 |
| Percent Na | 0.010 |
| Percent $SO_4$ | 0.054 |

The above slurry was diluted with acetic acid and autoclaved as described in Example 1 and gave a sol which analyzed as follows:

| | |
|---|---|
| Percent $Al_2O_3$ | 4.93 |
| Percent $CH_3COOH$ | 7.15 |
| $A_N$ m.$^2$/g | 291 |
| Average fibril length m$\mu$ | 408 |
| $L_f$ m$\mu$ | 397 |

EXAMPLE 13

An alumina gel was prepared as described in Example 1 except the molar $CO_3/Al$ ratio was maintained constant at 1.70±0.02. After precipitation, the gel was treated as in Example 1 to give a slurry which analyzed as follows:

| | |
|---|---|
| Percent $Al_2O_3$ | 6.1 |
| Na/Al | 0.006 |
| $SO_4$/Al | 0.004 |

The above slurry was diluted with acetic acid and autoclaved as described in Example 1 and gave a sol which analyzed as follows:

| | |
|---|---|
| Percent $Al_2O_3$ | 5.21 |
| Percent $CH_3COOH$ | 2.76 |

The fibrous alumina monohydrate fibers isolated from this sol analyzed as follows:

| | |
|---|---|
| Percent $Al_2O_3$ | 70.1 |
| Percent $CH_3COOH$ | 10.2 |
| $A_N$ m.$^2$/g | 318 |
| $L_f$ m$\mu$ | 291 |
| Average fibril length m$\mu$ | 236 |

The claims are:

1. The process for making fibrous alumina monohydrate aquasols comprising the steps of mixing a solution of alum with a solution of a soluble carbonate while maintaining a mole ratio of carbonate ions to aluminum of from about 1.50 to 1.90 so as to form carbonated, hydrated alumina gel having an activity, $\theta$, such that the time in minutes required to depolymerize one-half of a sample of such gel in excess 0.50 N acetic acid at 30° C. is less than 300 minutes, washing the gel with water until the gel contains a mole ratio of sulfate ions to aluminum of less than about 0.01:1 and a mole ratio of cations to aluminum of less than about 0.04:1, mixing the gel with a weak monobasic organic acid selected from the group consisting of acetic and formic acid so as to obtain an initial concentration of 5 to 10% $Al_2O_3$ and a mole ratio of aluminum to acid anion of from about 0.50:1 to 4.0:1, and heating the mixture of gel and acid under autogenous pressure to from about 140 to 180° C. for from about 10 minutes to 7 hours.

2. In a process for making fibrous alumina monohydrate the step of heating under autogenous pressure to from about 140° to 180° C. for from about 10 minutes to 7 hours a mixture of a weak monobasic organic acid selected from the group consisting of acetic acid and formic acid with a carbonated, hydrated alumina gel characterized by having an activity, $\theta$, such that the time in minutes required to depolymerize one-half of a sample of such gel weighing 0.5 gram $Al_2O_3$ equivalent weight in excess 0.50 N acetic acid at 30° C. is less than 300 minutes, such gel further having an initial mole ratio of carbonate ions to aluminum of from about 1.50:1 to 1.90:1, a mole ratio of sulfate ion to aluminum ion of less than about 0.01:1, a mole ratio of cations to aluminum of less than about 0.04:1, such mixture further having an initial concentration of carbonated, hydrated alumina gel in terms of $Al_2O_3$ content of from about 5 to 10% by weight and having a mole ratio of aluminum to weak acid anion of from about 0.50:1 to 4.0:1.

3. In a process for making fibrous alumina monohydrate the steps of heating a mixture of:
   (a) a weak monobasic organic acid selected from the group consisting of acetic and formic acids, and
   (b) a carbonated, hydrated alumina gel having a mole ratio of carbonate ions to aluminum of from about 1.50 to 1.90, a mole ratio of sulfate ions to aluminum of less than about 0.01:1, a mole ratio of cations to aluminum of less than about 0.04:1, and further having an activity, $\theta$, such that the time in minutes required to depolymerize one-half of a sample of the gel weighing 0.5 gram $Al_2O_3$ equivalent weight in excess 0.5 N acetic acid at 30° C. is less than 300 minutes, the proportions of acid and gel used in the mixture being those necessary to give an aluminum to acid anion mole ratio of from about 0.5:1 to 4.0:1, the mixture at first being heated to not more than reflux temperatures to cause evolution of carbon dioxide and then, after such evolution ceases, continuing heating at a temperature of from about 140° to 180° C. for from about 10 minutes to 7 hours under autogenous pressure.

4. The process for making fibrous alumina monohydrate aquasols comprising the steps of mixing a solution of alum with a solution of a soluble carbonate while maintaining a mole ratio of carbonate ions to alumina of from about 1.7±0.05 so as to form a carbonated, hydrated alumina gel having an activity, $\theta$, such that the time in minutes required to depolymerize one-half of a sample of such gel weighing 0.5 gram $Al_2O_3$ equivalent weight in excess 0.50 in acetic acid at 30° C. is less than 150 minutes, washing the gel with water until the gel contains a mole ratio of sulfate ions to aluminum of less than about 0.05:1 and a mole ratio of cations to aluminum between about 0.001:1 and 0.020:1, mixing the gel with a weak monobasic organic acid selected from the group consisting of acetic and formic acids so as to obtain an initial concentration of about 5 to 10% $Al_2O_3$ and a mole ratio of aluminum to acid anion of from about 0.50:1 to 4.0:1, and heating the mixture of gel and acid under autogenous pressure to from about 140 to 180° C. for from about 10 minutes to 7 hours.

5. In a process for making fibrous alumina monohydrate the step of heating under auotgenous pressure to from about 140 to 180° C. for from about 10 minutes to 7 hours a mixture of weak monobasic organic acid selected from the group consisting of acetic acid and formic acid with a carbonated, hydrated alumina gel characterized by having an activity, $\theta$, such that the time in minutes required to depolymerize one-half of a sample of such gel weighing 0.5 gram $Al_2O_3$ equivalent weight in excess 0.50 N acetic acid at 30° C. is less than 150 minutes, such gel further having a mole ratio of carbonate ions to aluminum initially from about 1.50:1 to 1.90:1, a mole ratio of sulfate ions to aluminum of less than about 0.01:1, and a mole ratio of cations to aluminum of between about 0.001:1 to 0.020:1, the mixture of such gel and such acid being such that the mole ratio of alumina to acid anion is from about 0.50:1 to 4.0:1 and the initial concentration of carbonated, hydrated alumina gel in the mix before autoclaving in terms of $Al_2O_3$ content is from about 5 to 10% by weight.

6. In a process for making fibrous alumina monohydrate the steps of heating a mixture of
 (a) a weak monobasic acid organic acid selected from the group consisting of acetic acid and formic acid, and
 (b) a carbonated, hydrated alumina gel having a mole ratio of carbonate ions to aluminum of about 1.7±0.05, a mole ratio of sulfate ions to aluminum of less than about 0.05:1, a mole ratio of cations to aluminum of less than about 0.03:1, and further having an activity, $\theta$, such that the time in minutes to depolymerize one-half of a sample of a gel weighing 0.50 gram $Al_2O_3$ equivalent weight excess 0.50 N acetic acid at 30° C. is less than 150 minutes.

the proportions of acid and gel used in the mixture being those necessary to give an aluminum to acid anion mole ratio of from about 0.75:1 to 1.5:1, the mixture first being heated to not more than reflux temperatures to cause evolution of carbon dioxide and then after such evolution ceases, continuing heating at a temperature of from about 140 to 180° for from about 10 minutes to 7 hours under autogenous pressure.

References Cited in the file of this patent
UNITED STATES PATENTS

| | | |
|---|---|---|
| 2,373,198 | Roehrich | Apr. 10, 1945 |
| 2,733,205 | Dalton et al. | Jan. 31, 1956 |
| 2,797,978 | Beekman | July 2, 1957 |
| 2,798,049 | White et al. | July 2, 1957 |
| 2,915,475 | Bugosh | Dec. 1, 1959 |